United States Patent
Kiessel et al.

[11] Patent Number: 5,937,665
[45] Date of Patent: Aug. 17, 1999

[54] GEOTHERMAL SUBCIRCUIT FOR AIR CONDITIONING UNIT

[75] Inventors: Thomas G. Kiessel; Rex K. Ambs, both of Traverse City, Mich.; Dennis L. Weston, Indianapolis, Ind.

[73] Assignee: Geofurnace Systems, Inc., Grawn, Mich.

[21] Appl. No.: 09/007,858

[22] Filed: Jan. 15, 1998

[51] Int. Cl.[6] .................................................. F25D 23/12
[52] U.S. Cl. ........................................... 62/260; 62/324.6
[58] Field of Search ......................... 62/260, 160, 324.1, 62/324.6; 165/45

[56] References Cited

U.S. PATENT DOCUMENTS

| | | |
|---|---|---|
| 1,554,654 | 9/1925 | Prisner . |
| 1,597,618 | 8/1926 | Prisner . |
| 2,726,067 | 12/1955 | Wetherbee ................................ 62/260 |
| 3,882,937 | 5/1975 | Robinson ................................. 166/267 |
| 4,171,721 | 10/1979 | Movick ..................................... 165/45 |
| 4,255,936 | 3/1981 | Cochran ................................... 62/260 |
| 4,286,651 | 9/1981 | Steiger et al. ............................ 165/45 |
| 4,325,228 | 4/1982 | Wolf ......................................... 62/260 |
| 4,493,193 | 1/1985 | Fisher ....................................... 62/160 |
| 4,512,156 | 4/1985 | Nagase .................................... 60/641.2 |
| 4,528,822 | 7/1985 | Glamm .................................... 62/238.7 |
| 4,671,351 | 6/1987 | Rappe ...................................... 165/133 |
| 4,714,108 | 12/1987 | Barry ........................................ 165/45 |
| 5,025,634 | 6/1991 | Dressler .................................... 62/79 |
| 5,239,838 | 8/1993 | Tressler ................................... 62/324.1 |
| 5,313,804 | 5/1994 | Kaye ........................................ 62/160 |
| 5,388,419 | 2/1995 | Kaye ........................................ 62/160 |
| 5,461,876 | 10/1995 | Dressler .................................... 62/160 |

FOREIGN PATENT DOCUMENTS

| | | |
|---|---|---|
| 2911425 | 9/1980 | Germany . |
| 3015149 | 10/1981 | Germany . |
| 3022588 | 12/1981 | Germany . |
| 3142347 | 5/1983 | Germany . |
| 3203526 | 8/1983 | Germany . |
| 57-187557 | 11/1982 | Japan . |
| 196933 | 10/1924 | United Kingdom . |

*Primary Examiner*—William Doerrler
*Attorney, Agent, or Firm*—Warner Norcross & Judd LLP

[57] ABSTRACT

A geothermal subcircuit for use with a conventional air conditioning unit. The subcircuit includes a geothermal heat exchanger that is buried in the ground or submerged in a lake, river, well or geothermal heat sink. The geothermal subcircuit is connected with the geothermal heat exchanger in parallel with the outdoor air coil. The control mechanism operates to selectively move refrigerant through the outdoor air coil during the cooling mode or through the geothermal heat exchanger during the heating mode.

14 Claims, 3 Drawing Sheets

GEOTHERMAL SUBCIRCUIT FOR AIR CONDITIONING UNIT

BACKGROUND OF THE INVENTION

The present invention relates to heating and cooling apparatus, and more particularly to a geothermal heat exchanger subcircuit for use with a conventional air conditioning unit.

Geothermal heating and cooling systems continue to grow in popularity. Geothermal systems are generally more efficient than conventional heating and cooling systems because they abstract from or release heat into a geothermal heat sink, such as the ground, a lake, a river, or a water well. Geothermal systems can typically be operated in either a heating mode or a cooling mode. In the heating mode, the geothermal heat exchanger draws heat from a geothermal heat sink and releases it into the indoor air. In the cooling mode, the geothermal heat exchanger draws heat from the indoor air and releases it into the geothermal heat sink. The efficiency of the geothermal system will depend in large part on the design of the heat exchanger and the temperature difference between the indoor air and the geothermal heat sink.

Air conditioning units are widely used throughout the United States to provide cooling of indoor air. A conventional air conditioning system 110 is shown in FIG. 3, and includes an outdoor unit 112 having an outdoor housing 140 that contains a compressor 118 for circulating refrigerant through the system, an accumulator 122 for handling certain refrigerant imbalances within the system, an outdoor coil 132 for exchanging heat with the outdoor air, and a fan 128 for moving air across the coil 132. A conventional system 110 also includes an indoor unit 114 having an indoor housing 138 that contains an indoor coil 132 for exchanging heat from the indoor air and a fan 136 for moving air across the indoor coil 132. The indoor and outdoor units, 114 and 112 respectively, are interconnected by refrigerant lines 148 and 146. Air conditioning units operate only to cool indoor air, and are typically shut-off when cooling is not desired. In operation, the air conditioning unit circulates refrigerant through the indoor coil 132 and the outdoor coil 120. The refrigerant draws heat from the indoor air as it evaporates in the indoor coil 132 and release the heat it into the outdoor air as it condenses in the outdoor coil 120.

A number of attempts have been made to combine the components of a geothermal system with the components of an air conditioning unit. For example, U.S. Pat. No. 5,461,876 issued Oct. 31, 1995 to Dressler discloses a system having a ground loop with a direct earth heat exchanger and an air loop with an outdoor air coil. The Dressler system is designed to permit the air loop and ground loop to operate individually, serially or in parallel to provide either heating or cooling as desired. The Dressler system is specially designed from the ground up to replace existing air conditioning units and geothermal systems. As a result, the Dressler system requires significant custom assembly. In addition, the Dressler system requires a large supply of refrigerant to fill both the outdoor air coil and the direct earth heat exchanger when the two components operate in series.

SUMMARY OF THE INVENTION

The aforementioned problems are overcome by the present invention which provides a geothermal subcircuit that is easily installed to a conventional air conditioning unit. The geothermal subcircuit permits the air conditioning unit to operate in a heating mode during which heat is drawn from a geothermal heat source and released into the indoor air through the existing indoor coil. The geothermal subcircuit is connected to the air conditioning circuit in parallel with the outdoor air coil, and includes components which permit refrigerant to be selectively directed through either the outdoor air coil or the geothermal heat exchanger.

In the preferred embodiment, the subcircuit includes a reversing valve connected in series between the compressor and the air coil of the air conditioning unit. The reversing valve operates to selectively interconnect the compressor with the geothermal heat exchanger for heating mode or with the outdoor air coil for cooling mode. The subcircuit also includes an accumulator to account for the refrigerant imbalance between heating and cooling modes.

The present invention provides a simple and efficient geothermal subcircuit that permits a conventional air conditioning unit to operate in both heating and cooling modes. The subcircuit is easily installed to a conventional air conditioning unit and utilizes the refrigerant and refrigerant circulation components of the air conditioning unit. This allows the subcircuit to be retrofit to millions of conventional air conditioning units already in use across the United States.

These and other objects, advantages, and features of the invention will be readily understood and appreciated by reference to the detailed description of the preferred embodiment and the drawings.

DETAILED DESCRIPTION OF THE PREFERRED EMBODIMENT

Figure 1:
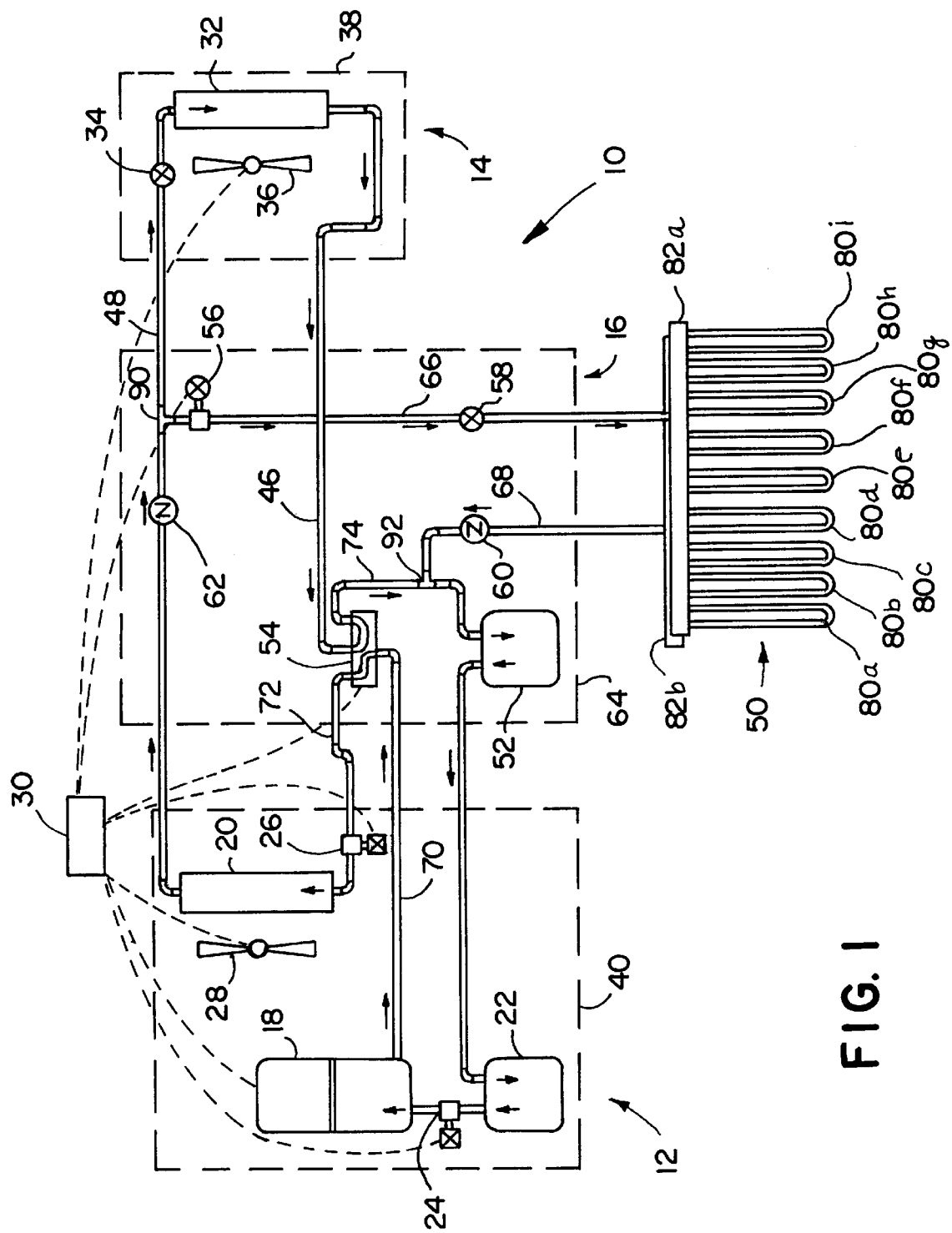
FIG. 1 is a schematic diagram showing the flow of refrigerant through the present invention in the cooling mode.
Figure 2:
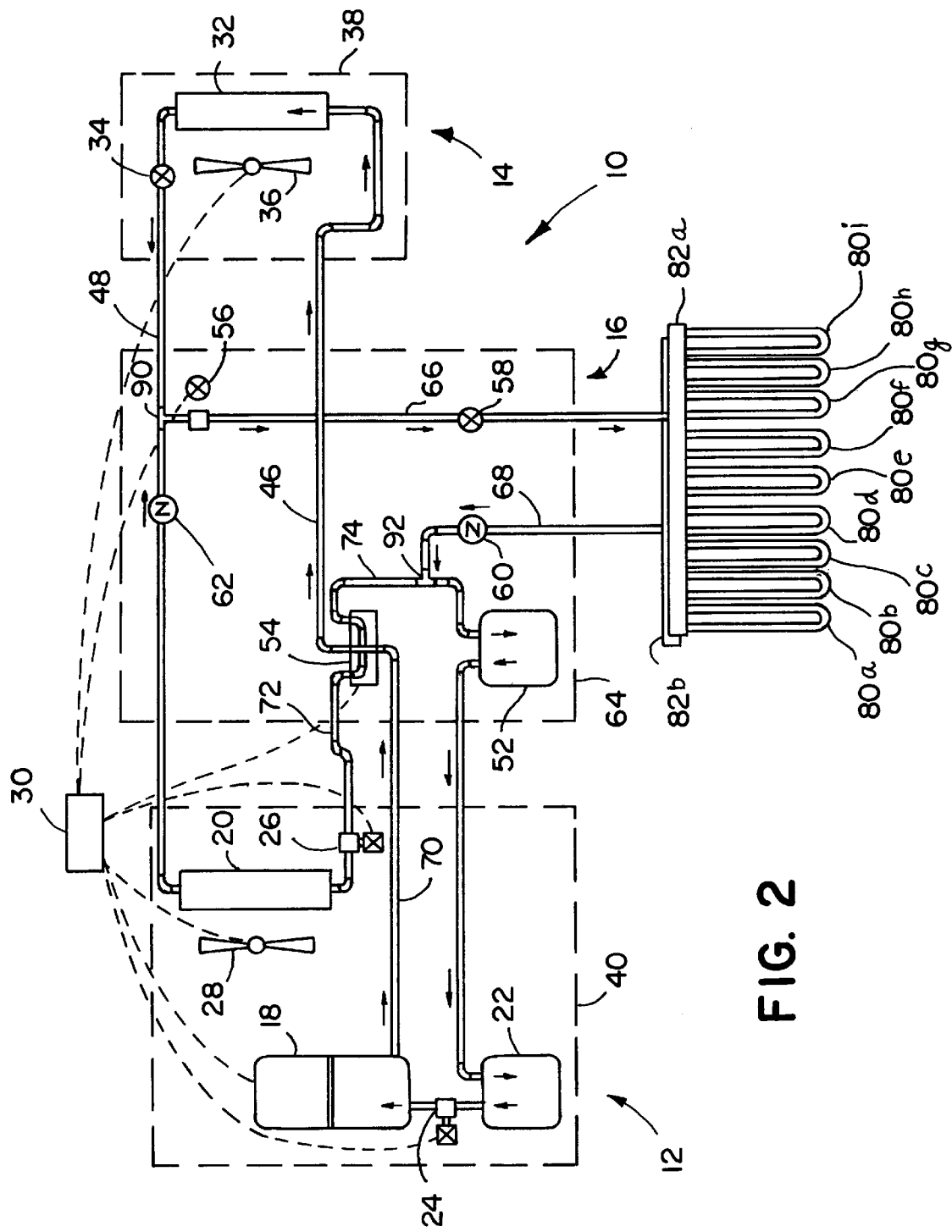
FIG. 2 is a schematic diagram showing the flow of refrigerant through the present invention in the heating mode.
Figure 3:
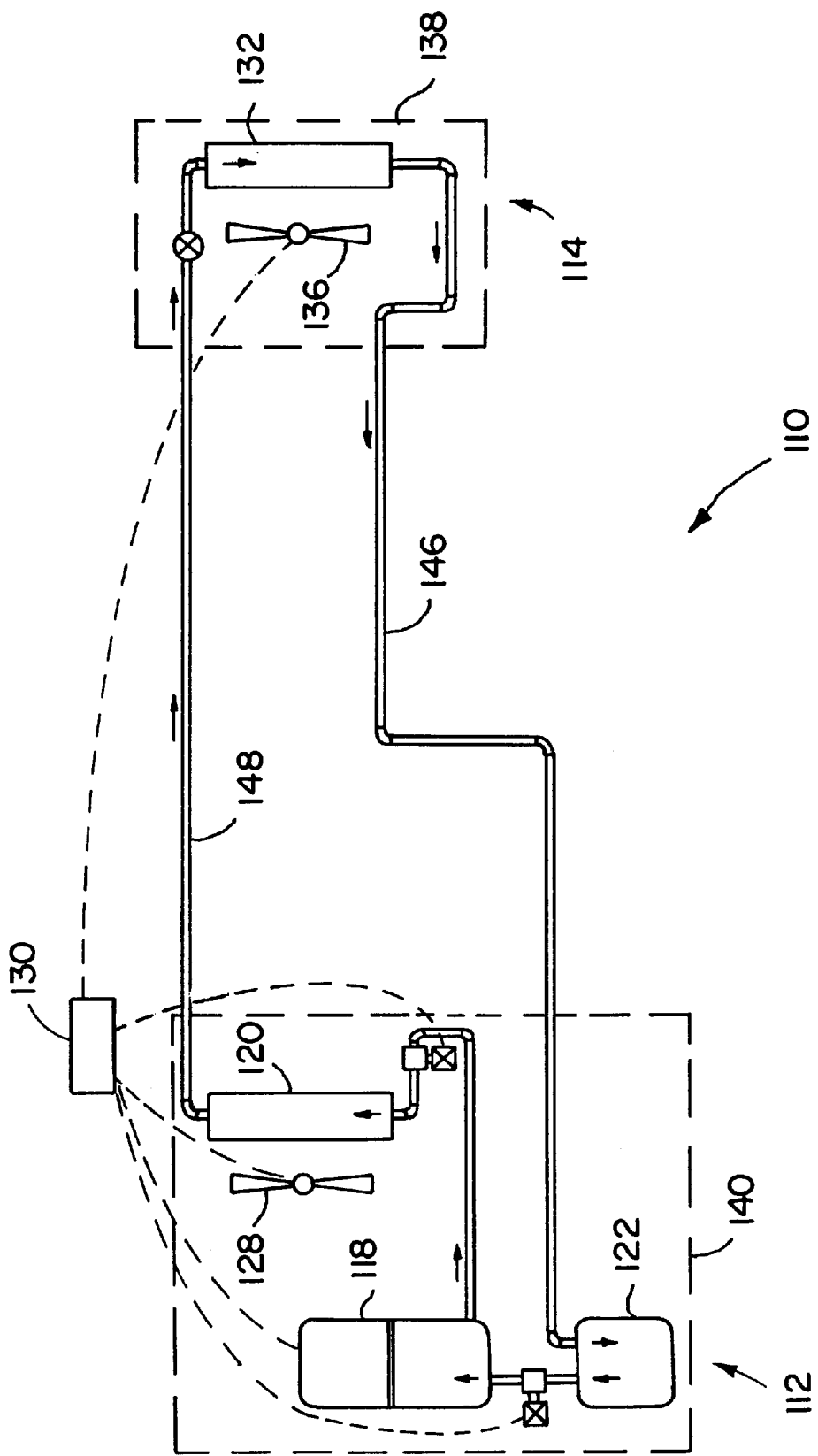
FIG. 3 is a schematic diagram showing a conventional air conditioning system.

A heating and cooling system according to a preferred embodiment of the present invention is shown in FIGS. 1 and 2, and generally designated 10. The system 10 generally includes a conventional air conditioning unit ("AC unit") 12, a conventional indoor unit 14, and a geothermal subcircuit 16. The system 10 operates to either cool the indoor air by abstracting heat through the indoor unit 14 and releasing it through the AC unit 12, or to heat the indoor air by abstracting heat through the geothermal subcircuit 16 and releasing it through the indoor unit 14. Except as described below, the operation and interrelationship of the components of the system 10 are well known to those skilled in the art. Accordingly, the individual components will not be described in detail. However, a general summary of the function of each component is provided. The particular AC unit 12 and indoor unit 14 described herein are merely exemplary. Those of ordinary skill in the field will readily appreciate and understand that the geothermal subcircuit 16 of the present invention is well suited for use with a wide variety of other AC units and indoor units.

As noted above, the AC unit 12 is generally conventional. Typically, the AC unit 10 will be purchased as a complete, assembled unit, such as Model No. 38CKB 036-3 available from Carrier Corporation of Indianapolis, Ind. However, the AC unit 10 could be custom manufactured if desired. The AC unit 12 includes a compressor 18, an air coil 20, an optional accumulator 22, an optional low pressure switch 24, an optional high pressure switch 26, and a network of refrigerant lines. These components are typically contained within a single housing 40 that is adapted for outdoor use. The compressor 18 is generally conventional and operates to pump refrigerant through the system 10. The air coil 20 is also generally conventional and operates as a condenser where gas refrigerant is cooled and changed into a liquid. During the phase change, the refrigerant releases a significant amount of heat into outdoor air. A conventional fan or blower 28 is provided to move air over the air coil 20, thereby increasing its efficiency.

The accumulator 22 is optional and, if included, operates to maintain the appropriate amount of refrigerant in circulation during both the heating and cooling modes. In certain applications, it may be necessary to include a conventional receiver (not shown) or other similar device for storing excess refrigerant.

The low pressure switch 24 and the high pressure switch 26 are also optional. These switches 24 and 26 are generally conventional and are safety devices that signal the control mechanism 30 to shut-off the system 10 if the pressure within the system 10 falls outside of an acceptable range. Many conventional AC units include low pressure and high pressure switches. If not included with the AC unit, these safety switches can be incorporated into the geothermal subcircuit 16.

The indoor unit 14 is conventional and may be purchased as an assembled unit, such as Model No. FA4A N F036 available from Carrier Corporation of Indianapolis, Ind. The indoor unit 14 includes an indoor air coil 32 for exchanging heat with the indoor air, an expansion device 34 for creating a pressure differential in the circuit during the cooling mode, and a fan or blower 36 for moving air across the coil 32. These components are typically contained within a single housing 38 that is integrated with or connected to the building's duct work in a conventional manner. The indoor unit 14 is interconnected with the AC unit 12 by a gas refrigerant line 46 extending between the indoor air coil 32 and the compressor 18, and a liquid refrigerant line 48 extending between the indoor air coil 32 and the outdoor air coil 20. The refrigerant lines 46 and 48 are generally conventional and are preferably conventional copper tubing. The diameter of the refrigerant line will vary from application to application depending on the capacity and design of the heat pump circuit and the type of refrigerant used in the circuit. However, in this embodiment, the liquid refrigerant line 48 is preferably three-eighths of an inch in diameter and the gas refrigerant line 46 is preferably three-fourths of an inch in diameter.

The geothermal subcircuit 16 generally includes a heat exchanger 50, an optional accumulator 52, a reversing valve 54, a solenoid valve 56, an expansion device 58, and a pair of one-way check valves 60 and 62. Preferably, the accumulator 52 is a conventional active charge control unit, such as Model No. ACC-6-3663 available from ECR Technologies, Inc. of Lakeland, Fla. With the exception of the heat exchanger 50, the various components of the geothermal subcircuit 16 are contained within a single housing 64. The geothermal subcircuit 16 is installed with the geothermal heat exchanger 50 arranged in parallel with the outdoor coil 20 as shown in FIGS. 1 and 2. The heat exchanger 50 is connected to the liquid refrigerant line 48 by refrigerant line 66 and to the gas refrigerant line 46 by refrigerant line 68. The solenoid valve 56 and expansion device 58, such as a fixed orifice, are installed in refrigerant line 66, and one-way check valve 60 is installed in refrigerant line 68. If the accumulator 52 is an active charge control unit, the expansion device 58 can be a conventional liquid flow control device, such as Model No. LFC-36 available from ECR Technologies, Inc. of Lakeland, Fla. Also, one-way check valve 62 is installed in liquid refrigerant line 48 between the outdoor coil 20 and refrigerant line 66. The reversing valve 54 is installed in gas refrigerant line 46. The primary of the reversing valve is connected to the compressor 18 by refrigerant line 70 and while its three secondaries are connected to the outdoor coil 20 by refrigerant line 72, the accumulator 52 by refrigerant line 74, and the indoor coil 32 by gas refrigerant line 46.

The present invention is well suited for use with a wide variety of conventional geothermal heat exchangers. However, in the preferred embodiment, the heat exchanger 50 is designed for use with the AC unit 12 and the indoor unit 14 combination described above, which is a three ton unit providing approximately 36,000 BTUs. The heat exchanger 50 includes a plurality of loops 80a–i interconnected with a pair of conventional manifolds 82a–b. Each loop 80a–i includes a generally U-shaped section of conventional copper tubing having a diameter of three-eighths of an inch and a length of approximately 120 feet. The number of loops and the diameter and length of each loop will vary from application to application depending on a variety of factors, including without limitation the volume of heat exchange desired, the type of refrigerant used in the circuit, the capacity of the system, the pressure differential in the circuit, the climate in which the system is installed, and the makeup of the geothermal heat source. The distributor manifold 82a interconnects the input end of each loop 80a–c with the refrigerant line 66. The output manifold 82b interconnects the output end of each loop 80a–i with the refrigerant line 68. This permits refrigerant to flow through the loop 80a–i in parallel. The loops 80a–i are preferably buried in the ground in separate holes, and are preferably encased in a conventional grout. Alternatively, the loops 80a–i can be submerged in a lake, river, stream, well or other body of water.

The system 10 also includes a control mechanism 30 for controlling operation of the system 10 as described in more detail below. The control mechanism 30 is preferably a conventional electromechanical control system that receives input from a conventional control panel (not shown), the low pressure switch 24, and the high pressure switch 26.

Installation and Operation

The AC unit 12 and indoor unit 14 are installed in a conventional manner using conventional techniques and apparatus. The AC and indoor units are preferably purchased as pre-assembled units from any of a variety of well known suppliers. Alternatively, the units can be assembled from the components described above. In either event, prior to installation of the geothermal subcircuit, the indoor and outdoor units are interconnected by liquid refrigerant line 48 and gas refrigerant line 46 as described above.

The geothermal subcircuit 16 can be installed during initial installation of the system 10 or it can be retrofit to an existing air conditioning system. If the air conditioning system is already in place, it will be necessary to cut the refrigerant lines extending between the AC unit 12 and the indoor unit 14 to install the geothermal subcircuit 16. Regardless of whether the system 10 is already in place, the AC housing 40 is opened and the refrigerant line extending between the compressor 18 and air coil 20 is cut to install the geothermal subcircuit 16. The line extending from the compressor 18 is connected to the primary of the reversing valve 54 by refrigerant line 70, and the line extending to the air coil 20 is connected to a secondary of the reversing valve 54. Refrigerant line 66 is preferably connected at one end to the manifold 82 and at the other end to the liquid refrigerant line 48 by a conventional "T" joint 90. Similarly, refrigerant line 60 is preferably connected at one end to the manifold 82 and at the other end to the refrigerant line 74 by a conventional "T" joint 92. The solenoid valve 56 and the expansion device 58 are installed in refrigerant line 66, one-way check valve 60 is installed in refrigerant line 68, and one-way check valve 62 is installed in liquid refrigerant line 48 between the outdoor coil 20 and the "T" joint 90. The reversing valve 54 and the solenoid valves 56 are operatively connected to the control mechanism 30 using conventional techniques and apparatus.

The system 10 is capable of operation in both cooling and heating modes. The cooling mode will be described in connection with FIG. 1. In the cooling mode, the control mechanism 30 places the reversing valve 32 in the cooling position so that refrigerant flows from the compressor 18 to the outdoor coil 20 and from the indoor coil 32 back to the compressor 18 through the accumulator 52 and the accumulator 22 (both optional). In other words, the reversing valve 54 interconnects refrigerant line 70 with refrigerant line 72 and refrigerant line 46 with refrigerant line 74. The control mechanism 30 also closes solenoid valve 56 so that refrigerant is not drawn through the geothermal heat exchanger 50. In the outdoor coil 20, the vaporized refrigerant condenses into a high pressure liquid thereby releasing heat energy into the outdoor air. The transfer of heat is expedited by the outdoor fan 28 which moves air over the outdoor coil 20. The liquid refrigerant flows from the outdoor air coil 28 into the liquid refrigerant line 48. The liquid refrigerant flows through the check valve 62. Because solenoid valve 56 is closed, refrigerant does not flow to the heat exchanger. Instead, the refrigerant flows through the expansion device 34. The expansion device 34 meters the refrigerant to separate the high pressure side of the circuit from the low pressure side of the circuit. The liquid refrigerant flows through the expansion device 34 into low pressure side of the circuit and the indoor coil 32. In the indoor coil 32, the liquid refrigerant evaporates into a gas, thereby abstracting heat from the indoor air. From the indoor coil 32, the low pressure gas refrigerant flows through the gas refrigerant line 46 to the reversing valve 54. The reversing valve 54 directs the gas refrigerant into refrigerant line 74. From refrigerant line 74, the gas refrigerant flows through the accumulator 52 and the accumulator 22, and eventually returns to the compressor 18 to repeat the cycle. The check valve 60 prevents gas refrigerant from flowing into the heat exchanger 50 through refrigerant line 68.

In the heating mode, the cycle is essentially reversed. The heating mode is shown in FIG. 2. The control mechanism 30 places the reversing valve 54 in the heating position so that refrigerant line 70 is interconnected with refrigerant line 46 and refrigerant line 74 is effectively closed. The control mechanism 30 also opens solenoid valve 56 to open a flow path from the indoor coil 32 to the geothermal heat exchanger 50. The vaporized refrigerant flows from the reversing valve 54 through the gas refrigerant line 46 to the indoor coil 32. In the indoor coil 32, the vaporized refrigerant condenses into a high pressure liquid, thereby releasing heat energy into the indoor air. The transfer of heat is expedited by the indoor blower 36 which moves air over the indoor coil 32. The liquid refrigerant flows from the indoor air coil 32 into the liquid refrigerant line 48. The liquid refrigerant bypasses the expansion device 34 and, because solenoid valve 56 is open, flows into refrigerant line 66. The check valve 62 prevents gas refrigerant from flowing back to the outdoor coil 20 through refrigerant line 48. The liquid refrigerant then flows through the expansion device 58, which meters the refrigerant to separate the high pressure side of the circuit from the low pressure side of the circuit. The liquid refrigerant flows through the expansion device 58 into the low pressure side of the circuit and the distributor manifold 82a of the heat exchanger 50. From the distributor manifold 82a, the refrigerant flows in parallel through the various loop 80a–i. In the loops 80a–i, the refrigerant evaporates into a gas, thereby abstracting heat from the geothermal heat source. The vaporized refrigerant flows from the loops 80a–i into the output manifold 82b and then into refrigerant line 68. From refrigerant line 68, the refrigerant flows into refrigerant line 74 and then through the accumulator 52 and the accumulator 22. The gas refrigerant then returns to the compressor 18 to repeat the cycle.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A heating and cooling circuit comprising:

an air conditioning unit having a compressor for circulating a refrigerant through the circuit and an outdoor coil for condensing gas refrigerant into a liquid, said compressor and said outdoor coil contained within an outdoor housing;

an indoor unit having an indoor coil for condensing gas refrigerant into a liquid and evaporating liquid refrigerant into a gas, said indoor coil interconnected with said compressor and said outdoor coil by a liquid refrigerant line and a gas refrigerant line;

a geothermal subcircuit including a geothermal heat exchanger for evaporating liquid refrigerant into a gas, said heat exchanger connected to the circuit in parallel with said outdoor coil, said geothermal subcircuit further including a reversing valve operable between a cooling position in which said refrigerant is circulated through said outdoor coil and said indoor coil and a heating position in which said refrigerant is circulated through said geothermal heat exchanger and said indoor coil, said geothermal subcircuit including an accumulator for regulating a volume of said refrigerant within the circuit, said accumulator positioned along said gas refrigerant line between said heat exchanger and said compressor, said reversing valve positioned along said gas refrigerant line, said reversing valve having a primary interconnected with said compressor, a first secondary interconnected with said outdoor coil via a first section of said gas refrigerant line, a second secondary interconnected with said accumulator via a second section of said gas refrigerant line, and a third secondary interconnected with said indoor coil; and a control means for selectively moving said reversing valve between said cooling position and said heating position.

2. A heating and cooling circuit comprising:

an air conditioning unit having a compressor for circulating a refrigerant through the circuit and an outdoor coil for condensing gas refrigerant into a liquid, said compressor and said outdoor coil contained within an outdoor housing;

an indoor unit having an indoor coil for condensing gas refrigerant into a liquid and evaporating liquid refrigerant into a gas, said indoor coil interconnected with said compressor and said outdoor coil by a liquid refrigerant line and a gas refrigerant line;

a geothermal subcircuit including a geothermal heat exchanger for evaporating liquid refrigerant into a gas, said heat exchanger connected to the circuit in parallel with said outdoor coil, said geothermal subcircuit further including a reversing valve operable between a cooling position in which said refrigerant is circulated through said outdoor coil and said indoor coil and a heating position in which said refrigerant is circulated through said geothermal heat exchanger and said indoor coil, said geothermal subcircuit including an accumulator for regulating a volume of said refrigerant within the circuit, said accumulator positioned along said gas refrigerant line between said heat exchanger and said compressor, said geothermal subcircuit including a first refrigerant line interconnecting said heat exchanger with said liquid refrigerant line and a second refrigerant line interconnecting said heat exchanger with said gas refrigerant line between said reversing valve and said accumulator; and a control means for selectively moving said reversing valve between said cooling position an d said heating position.

3. The circuit of claim 2 further comprising a first one-way check valve positioned in said liquid refrigerant line between said outdoor coil and said first refrigerant line, said first check valve prohibiting said refrigerant from flowing from said indoor coil to said outdoor coil through said liquid refrigerant line.

4. The circuit of claim 3 further comprising a valve positioned within said first refrigerant line, said valve selectively operable between an open position in which said refrigerant is free to flow through said first refrigerant line and a closed position in which said refrigerant if prohibited from flowing through said first refrigerant line.

5. The circuit of claim 4 further comprising a second one-way check valve positioned in said second refrigerant line between said heat exchanger and said gas refrigerant line, said second check valve prohibiting said refrigerant from flowing from said gas refrigerant line to said heat exchanger through said second refrigerant line.

6. The circuit of claim 5 further comprising an expansion device positioned in said first refrigerant line to divide the circuit into a high pressure portion and a low pressure portion when said reversing valve is in said heating position.

7. A geothermal subcircuit adapted to install to an air conditioning system having an air conditioning unit with a compressor and an outdoor coil and an indoor unit having an indoor air coil wherein the air conditioning unit is interconnected with the indoor unit by a liquid refrigerant line and a gas refrigerant line, comprising:

a geothermal heat exchanger for evaporating liquid refrigerant into a gas;

a first refrigerant line adapted to interconnect said heat exchanger with the liquid refrigerant line;

a second refrigerant line adapted to interconnect said heat exchanger with the gas refrigerant line, said first and second refrigerant lines adapted to interconnect said heat exchanger in parallel with the outdoor coil;

an accumulator for regulating a volume of said refrigerant within the system, said accumulator adapted to be positioned along the gas refrigerant line between said heat exchanger and the compressor a reversing valve operable between a cooling position adapted to circulate a refrigerant through the outdoor coil and the indoor coil and a heating position adapted to circulate said refrigerant through said geothermal heat exchanger and the indoor coil, said reversing valve adapted to be positioned along the gas refrigerant line, said reversing valve having a primary adapted to be interconnected with the compressor, a first secondary adapted to be interconnected with the outdoor coil via a first section of the gas refrigerant line, a second secondary adapted to be interconnected with said accumulator via a second section of the gas refrigerant line, and a third secondary adapted to be interconnected with the indoor coil; and a control means for selectively moving said reversing valve between said cooling position and said heating position.

8. The subcircuit of claim 7 wherein said second refrigerant line is adapted to interconnect said heat exchanger with the gas refrigerant line between said reversing valve and said accumulator.

9. The subcircuit of claim 8 further comprising a first one-way check valve adapted to be positioned in the liquid refrigerant line between the outdoor coil and said first refrigerant line, said first check valve adapted to prohibit said refrigerant from flowing from said indoor coil to said outdoor coil through the liquid refrigerant line.

10. The subcircuit of claim 9 further comprising a valve adapted to be positioned within said first refrigerant line, said valve selectively operable between an open position adapted to permit refrigerant to flow through said first refrigerant line and a closed position adapted to prohibit refrigerant from flowing through said first refrigerant line.

11. The subcircuit of claim 10 further comprising a second one-way check valve adapted to be positioned in said second refrigerant line between said heat exchanger and the gas refrigerant line, said second check valve adapted to prohibit said refrigerant from flowing from the gas refrigerant line to said heat exchanger through said second refrigerant line.

12. The subcircuit of claim 11 further comprising an expansion device adapted to be positioned in said first refrigerant line to divide the circuit into a high pressure portion and a low pressure portion when said reversing valve is in said heating position.

13. An apparatus comprising:

an air conditioning unit including a compressor and an outdoor coil contained within an outdoor housing;

an indoor unit including an indoor coil contained within an indoor housing;

a gas refrigerant line interconnecting said air conditioning unit and said indoor unit, said gas refrigerant line including a portion extending between said outdoor housing and said indoor housing;

a liquid refrigerant line interconnecting said air conditioning unit and said indoor unit, said liquid refrigerant line including a portion extending between said outdoor housing and said indoor housing;

a geothermal subcircuit including a geothermal heat exchanger and an accumulator, said heat exchanger connected to said compressor in parallel with said outdoor coil, said accumulator connected to said compressor in series with said heat exchanger, said geothermal subcircuit further including a reversing valve operable between a cooling position in which said refrigerant is circulated through said outdoor coil and said indoor coil and a heating position in which said refrigerant is circulated through said geothermal heat exchanger and said indoor coil, said reversing valve positioned along said gas refrigerant line, said reversing valve having a primary interconnected with said compressor, a first secondary interconnected with said outdoor coil via a first section of said gas refrigerant line, a second secondary interconnected with said accumulator via a second section of said gas refrigerant line, and a third secondary interconnected with said indoor coil; and a control means for selectively moving said reversing valve between said cooling position and said heating position.

14. The apparatus of claim 13 wherein said heat exchanger is connected to said liquid refrigerant line by a first refrigerant line and to said gas refrigerant line by a second refrigerant line; and further comprising:

a first one-way check valve positioned in said liquid refrigerant line between said outdoor coil and said first refrigerant line, said first check valve prohibiting said refrigerant from flowing from said indoor coil to said outdoor coil through said liquid refrigerant line;

a second one-way check valve positioned in said second refrigerant line between said heat exchanger and said gas refrigerant line, said second check valve prohibiting said refrigerant from flowing from said gas refrigerant line to said heat exchanger through said second refrigerant line;

a valve positioned within said first refrigerant line, said valve selectively operable between an open position in which said refrigerant is free to flow through said first refrigerant line and a closed position in which said refrigerant if prohibited from flowing through said first refrigerant line; and an expansion device positioned in said first refrigerant line to divide the circuit into a high pressure portion and a low pressure portion when said reversing valve is in said heating position.

* * * * *